Figure 1:
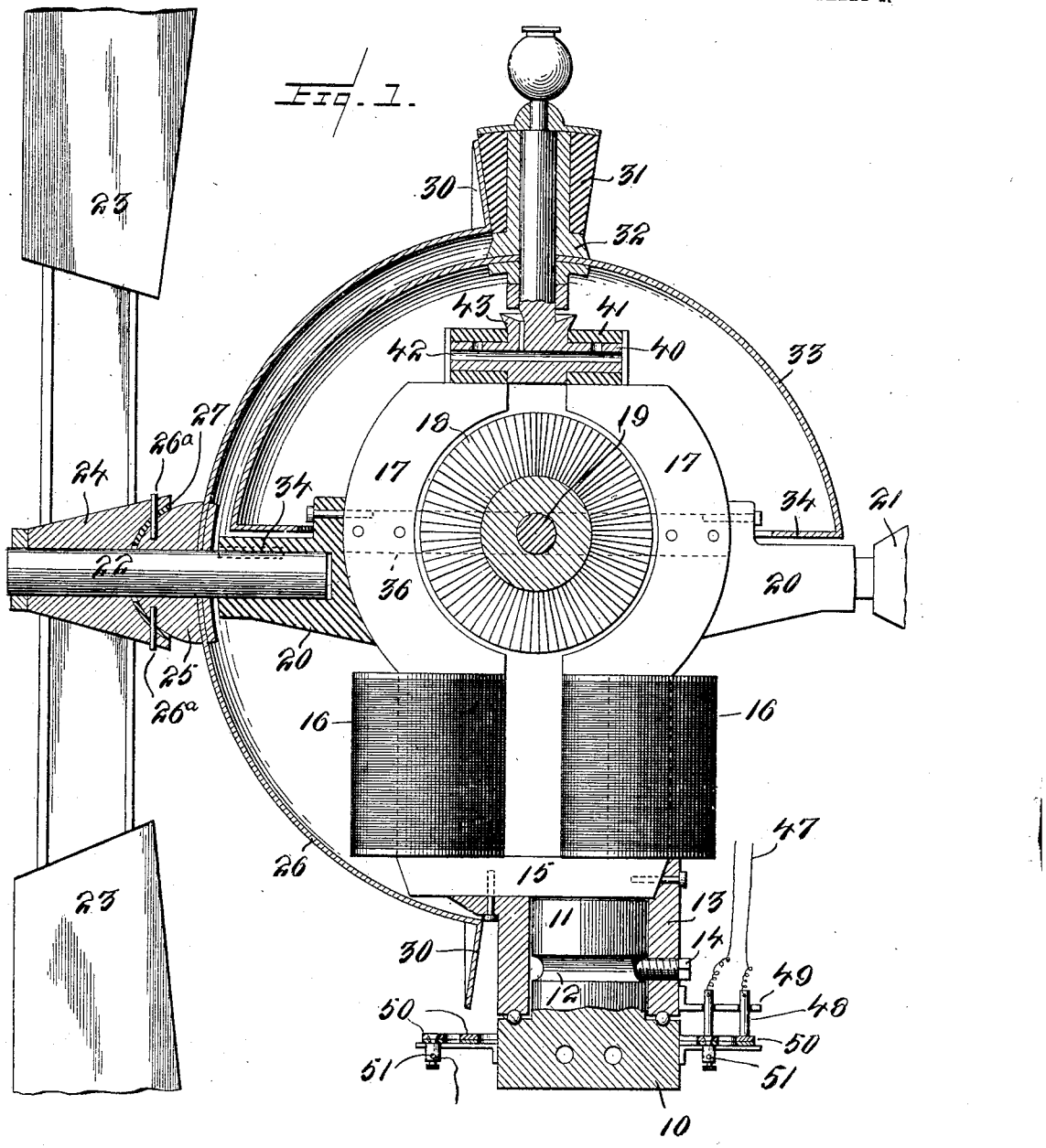

A. CARLSON.
GEARING.
APPLICATION FILED AUG. 9, 1909.

967,324.

Patented Aug. 16, 1910.

2 SHEETS—SHEET 1.

WITNESSES
Wm F Koyle
Alfred T Gage

INVENTOR
Alfred Carlson.
BY
E B Stocking
Attorney

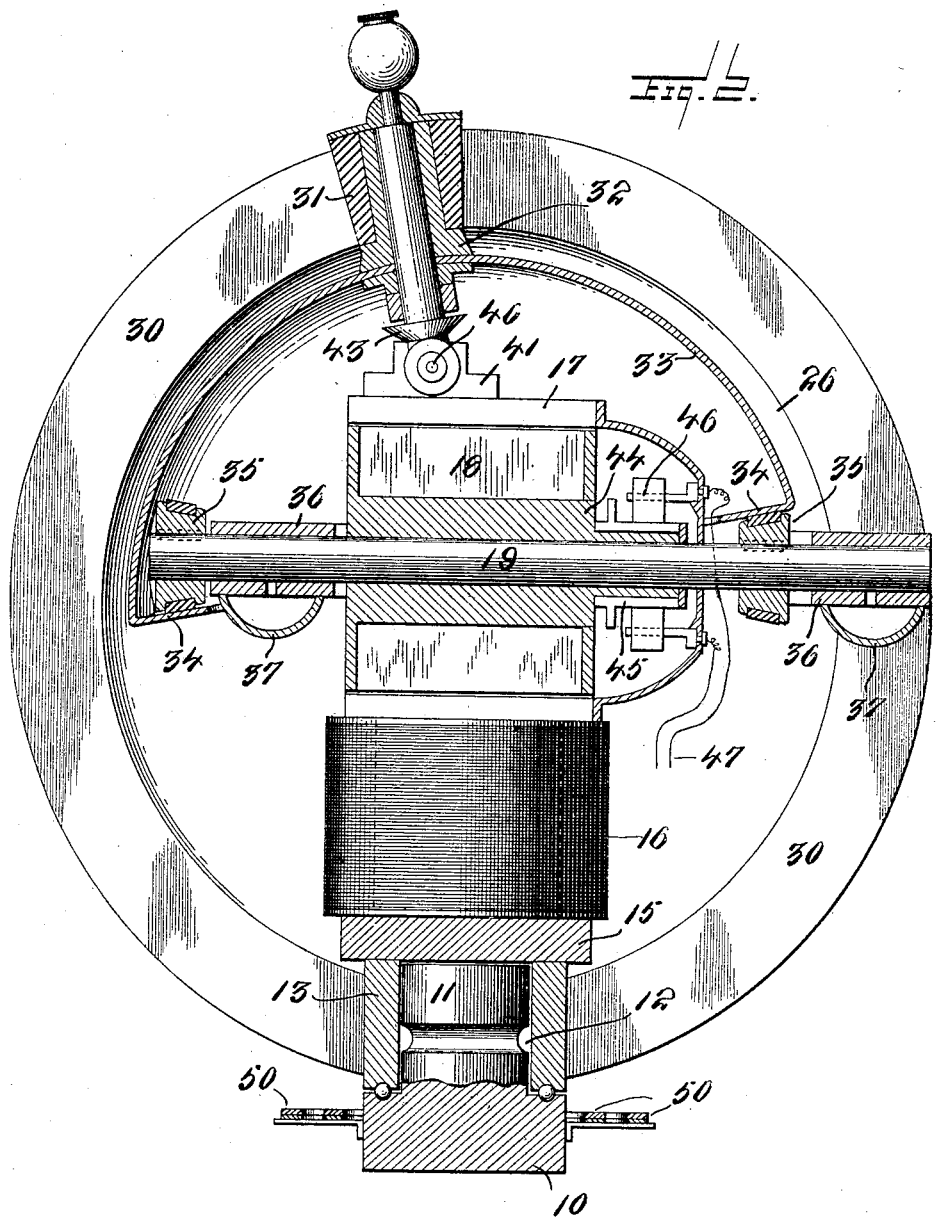

UNITED STATES PATENT OFFICE.

ALFRED CARLSON, OF KLAMATH FALLS, OREGON.

GEARING.

967,324. Specification of Letters Patent. Patented Aug. 16, 1910.

Application filed August 9, 1909. Serial No. 511,916.

*To all whom it may concern:*

Be it known that I, ALFRED CARLSON, citizen of the United States, residing at Klamath Falls, county of Klamath, State of Oregon, have invented certain new and useful Improvements in Gearing, of which the following is a specification, reference being had therein to the accompanying drawing.

This invention relates to a gearing for an electric generator and particularly to a construction adapted to be actuated from a wind wheel.

The invention has for an object to provide a novel and improved construction for transmitting power from a wind wheel to the armature of an electric generator.

Other and further objects and advantages of the invention will be hereinafter set forth and the novel features thereof defined in the appended claims.

In the drawings—Figure 1 is a vertical section; and Fig. 2 is a similar section at a right angle to Fig. 1.

Like numerals of reference refer to like parts in the several figures of the drawings.

The numeral 10 designates the base of the apparatus which may comprise the upper portion of the tower for a wind wheel. This base is provided with a stem 11 having a groove 12 circumferential thereof and is surrounded by a sleeve 13 provided with a set screw 14 extending into said groove. This sleeve is adapted to support the wind wheel and generator and has secured thereto the frame 15 upon which the magnets 16 for energizing the field pieces 17 are mounted. Within these field pieces an armature 18 is mounted upon the shaft 19. Secured to these field pieces at their outer faces are bearing brackets 20 formed of non-conducting and non-magnetic material. In one of these brackets the tail of vane 21 of the wind wheel is secured and in the other the shaft 22 of the wind wheel 23 is secured. The hub 24 of this wheel is loosely mounted on the shaft 22 as is also the hub 25 of the disk 26. These hubs are secured together by means of pins 26ᵃ and interposed rubber packings 27 so as to rotate in unison upon the shaft 22 in the rotation of the wind wheel. The disk 26 carried by the hub 25 is semi-spherical in shape and provided with a driving flange 30 disposed at an angle thereto and adapted to contact with a friction driving wheel 31 formed of rubber or any desired material. This wheel 31 is mounted upon a hub 32 which has secured thereto the semi-spherical disk 33 provided with the driving flange 34 which is adapted to contact with friction rollers 35 secured to the shaft 19 of the armature 18 before described. This flange is disposed in a plane inclined to said shaft so as to contact with the upper face of one of the rollers 35 and with the lower face of the roller at the opposite end of the shaft so as to secure a positive rotation of the shaft in the same direction. This shaft is supported in bearings 36 carried by the field magnets and each bearing is formed with an oil reservoir 37 communicating therewith.

The hub 40 of the bearing 32 is mounted in a casing 41 supported upon the field magnet 17 and has an aperture 42 extending therethrough as shown in Fig. 1. A lubricant may be introduced to this aperture through the cup 43 carried by the bearing 40 and is thus fed to the parts thereof.

The hub 44 of the armature 18 is provided with a commutator 45 of any desired construction with which the brushes 46 contact. The circuit from these brushes is carried by lines 47 to contacts 48 mounted in a bracket 49 upon the sleeve 13 and frictionally engaging the annular plates 50 secured upon a fixed part of the apparatus and provided with contact posts 51 from which the current generated may be conveyed.

In the operation of the invention it will be seen that in the rotation of the wind wheel 23 motion is transmitted to the disk 26 which through the frictional hub 31 actuates the disk 33 contacting with the driving rollers 35 upon the shaft 19. The armature is revolved by this shaft within the field magnets and electric current generated in the usual manner and this current may be conducted from the tower of the wind wheel by any desired circuit connections. It will be obvious that this construction prevents the transmission to the driving disk of the vibration usually present in a wind wheel and insures a smooth and continuous rotation of the armature. The driving disks for this purpose are disposed with their axes at an angle to each other while the driving flange upon the inner disk is disposed in an inclined plane in order to drive the armature shaft at opposite ends thereof without the use of interposed gearing.

The invention presents a simple, economically constructed and very efficient driving means for an electric generator which may be actuated by a wind wheel or any other desired source of power.

Having described my invention and set forth its merits what I claim and desire to secure by Letters Patent is—

1. In a device of the class described, a driving shaft, a segmental disk thereon having a friction flange, a driven shaft, means thereon to engage said flange, a driven disk carried by the driven shaft partially within said segmental disk and provided with a friction flange, a shaft, and friction rollers thereon contacting with said driven disk.

2. In a device of the class described, a driving shaft, a disk thereon having a friction flange, a driven shaft, means thereon to engage said flange, a driven disk carried by the driven shaft and provided with a friction flange, a shaft, and friction rollers thereon disposed to contact with the opposite faces of the flange of the driven disk.

3. In a device of the class described, a driving shaft, a disk thereon having a friction flange, a driven shaft mounted for lateral oscillation, means thereon engaging said flange, a driven disk carried by the driven shaft and provided with a friction flange, a shaft, and friction rollers thereon contacting with said driven disk.

4. In a device of the class described, a driving shaft, a segmental disk thereon having an angularly disposed friction flange, a driven shaft provided with a friction wheel engaging said flange, a driven disk carried by the driven shaft partially within said segmental disk and having a laterally disposed friction flange, a shaft, and friction rollers thereon to engage said flange.

5. In a device of the class described, a rotatively mounted head, bearings carried by said head, a driven member having its shaft mounted in said bearings, a driving wheel supported upon said head, a cupped driving disk provided with a lateral flange, a friction wheel mounted to engage said flange, a cupped driven disk having a lateral flange and carried by said friction wheel, and a roller upon the shaft of said driven member to engage the flange of the driven disk.

6. In a device of the class described, a driving shaft mounted in bearings and provided with a hub, a driving wheel mounted upon said shaft and connected to said hub, an elastic packing disposed between said hub and wheel, a disk carried by said hub and provided with a flange, a friction roller engaging said flange, a disk carried by said friction roller, and a member contacting with said last mentioned disk to be driven thereby.

7. In a device of the class described, a driving wheel, a friction disk thereon, a roller engaging said disk, a shaft for said roller, a bearing carried by said shaft and disposed at an angle to the axis thereof and driving means carried by said shaft.

8. In a device of the class described, a driving wheel, a friction disk thereon, a roller engaging said disk, a shaft for said roller, a tubular bearing carried by said shaft at one end and disposed at an angle to said shaft, driving means carried by said shaft, and an oil cup carried by said bearing and communicating with the interior thereof.

In testimony whereof I affix my signature in presence of two witnesses.

ALFRED CARLSON.

Witnesses:
  LESLIE ROGERS,
  ALEX MARTIN, Jr.